United States Patent
Howard et al.

[11] Patent Number: 5,154,989
[45] Date of Patent: Oct. 13, 1992

[54] ENERGY STORAGE DEVICE

[75] Inventors: William G. Howard, Roseville, Minn.; Roger W. Kelm, New Richmond; Nathan Torgerson, Woodville, both of Wis.

[73] Assignee: Medtronic, Inc., Minneapolis, Minn.

[21] Appl. No.: 754,866

[22] Filed: Sep. 4, 1991

[51] Int. Cl.⁵ .................. H01M 2/22; H01M 2/26
[52] U.S. Cl. ..................... 429/160; 429/161
[58] Field of Search ............. 429/152, 160, 161, 122, 429/123, 149

[56] References Cited

U.S. PATENT DOCUMENTS

| | | | |
|---|---|---|---|
| 2,715,652 | 8/1955 | Chubb et al. | 429/152 X |
| 3,006,980 | 10/1961 | Story | 429/161 X |
| 3,069,484 | 12/1962 | Hansen | 429/161 X |
| 3,597,277 | 8/1971 | Dickfeldt et al. | 429/161 |
| 3,837,925 | 9/1974 | Cailley et al. | 429/161 |
| 4,371,597 | 2/1983 | Jkeda et al. | 429/153 |
| 4,666,799 | 5/1987 | Runquist et al. | 429/162 |
| 4,780,379 | 10/1988 | Puester | 429/160 X |
| 5,001,024 | 3/1991 | Eberle | 429/160 |

*Primary Examiner*—Anthony Skapars

[57] ABSTRACT

Electrode construction and assembly for energy storage devices such as capacitors and batteries wherein the electrodes, both anode and cathode, are of one piece construction folded and interleaved to provide an electrode assembly of improved operation.

26 Claims, 4 Drawing Sheets

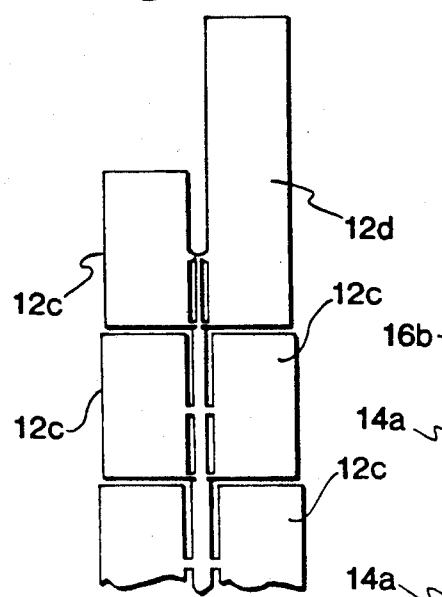
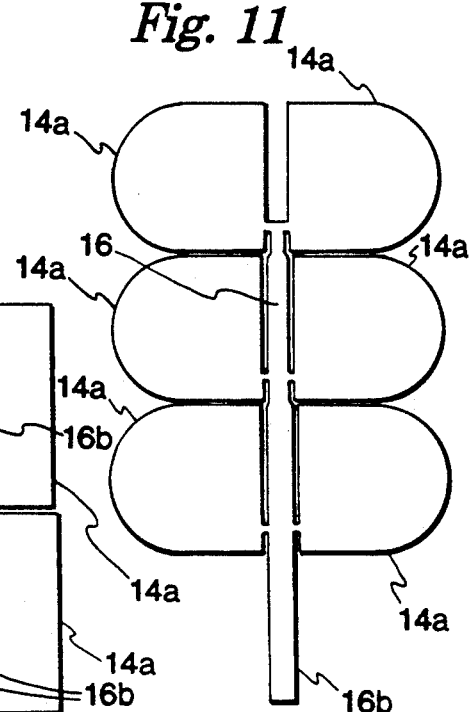
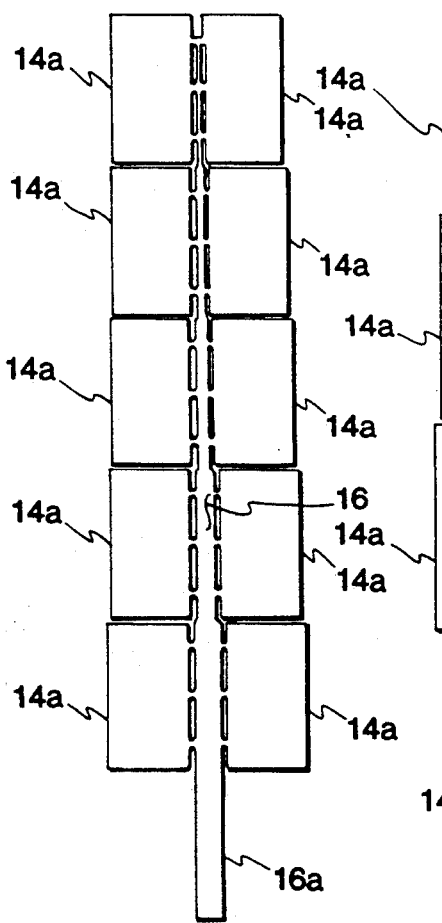
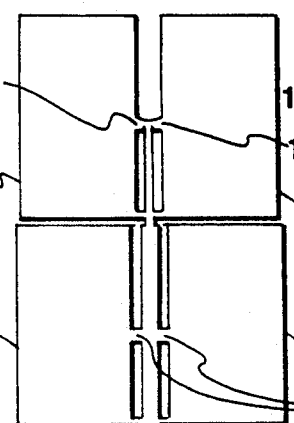
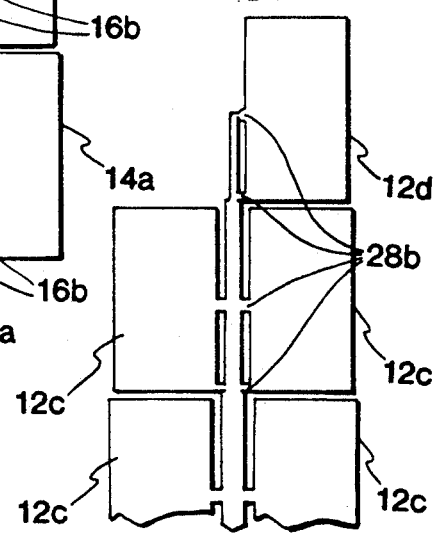

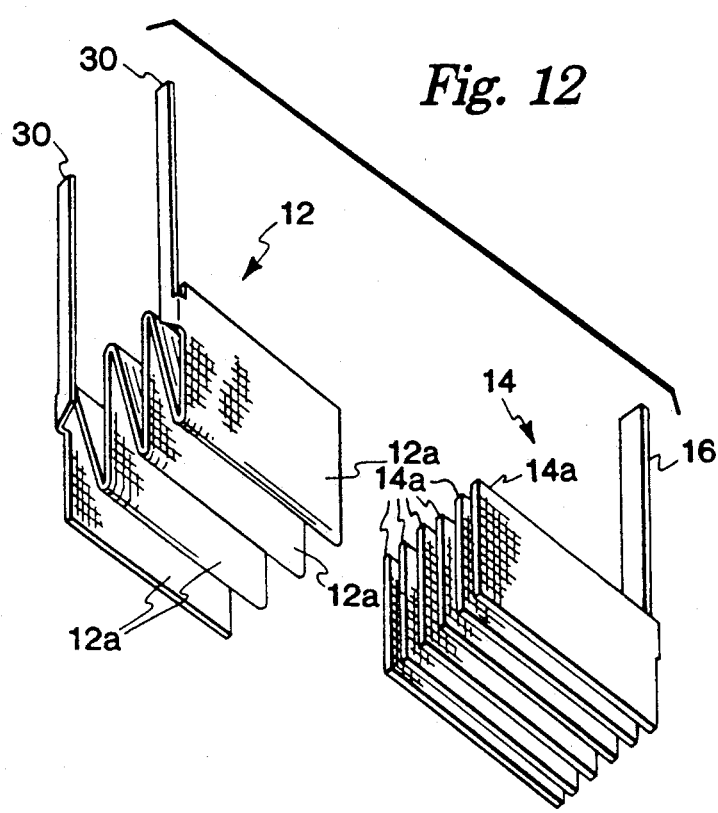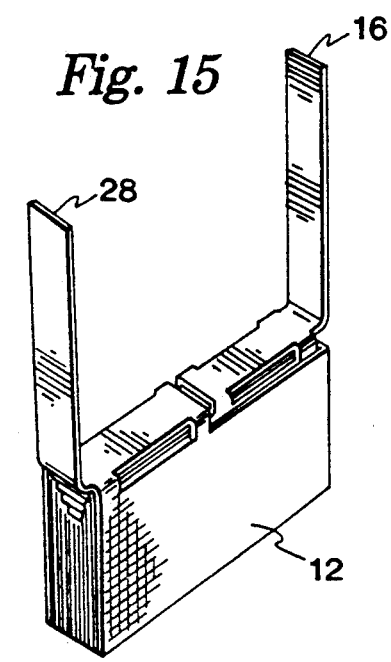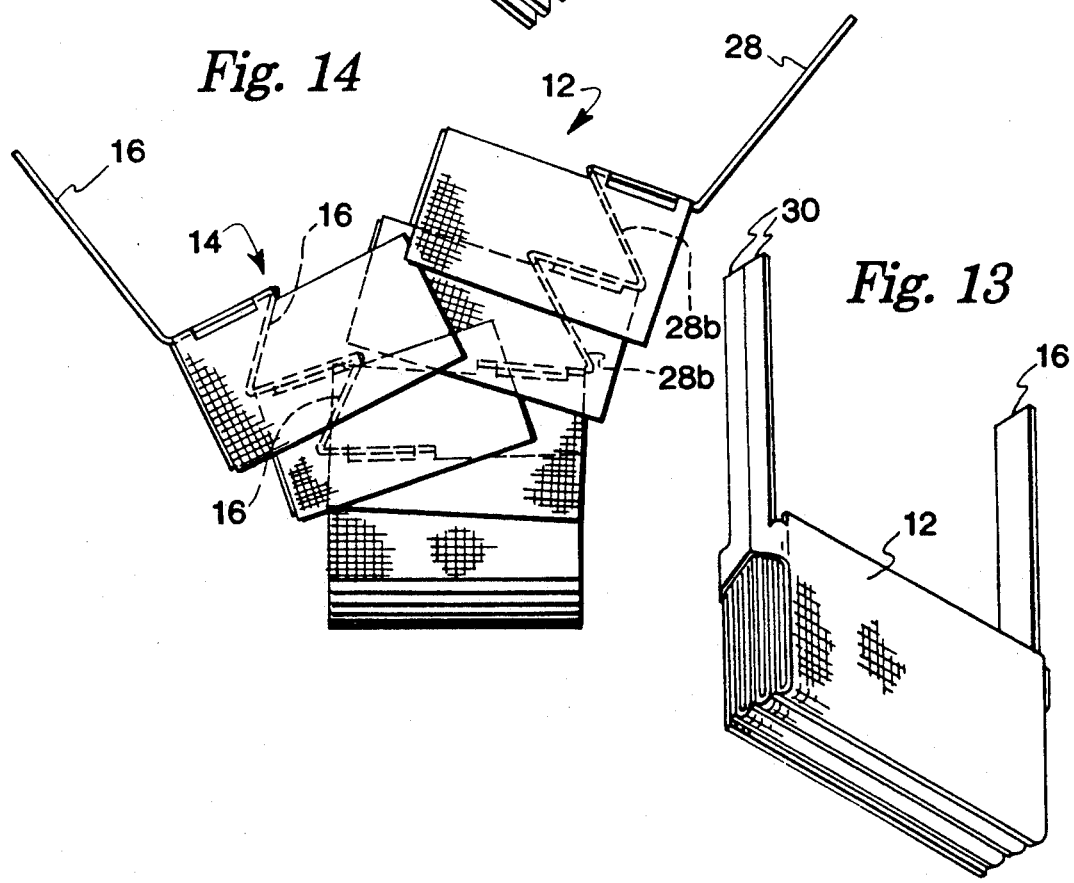

ENERGY STORAGE DEVICE

BACKGROUND OF THE INVENTION

This invention relates to the art of energy storage devices such as capacitors and batteries including electrolytic capacitors, ceramic capacitors, foil capacitors, super capacitors, double layer capacitors, and aqueous and non-aqueous primary and secondary batteries. Even more particularly it relates to lithium batteries having solid cathodes and liquid organic electrolytes for delivering high current pulses as the preferred form of the invention.

The improved electrode assembly of the invention can be variously applied to energy storage devices particular for improved operation. However, recent advances in implantable medical devices such as cardioverter/defibrillators and improved pacemakers of more complicated design have led to a need for batteries to power such devices. In particular, the ability of an implantable battery to deliver high current pulses and rapidly recover its open circuit voltage has become an important performance characteristic. The various new medical devices demand power sources with high capacity, low self-discharge and good pulsing behavior. This invention is particuarly applicable to the need.

SUMMARY OF THE INVENTION

It is then a primary purpose of the subject invention to provide an improved electrode assembly for high reliability electrochemical cells to be used as implantable power source for electrically operated medical devices. In achieving this purpose, the subject invention,
1. simplifies cell construction;
2. provides an electrode array connected by a lower resistance conductor and a relatively short electrical conductor path;
3. minimizes the number of welds required for multi-electrode cells;
4. improves cell reliability by providing a continuous conductor network;
5. provides an electrode assembly which efficiently utilizes cell volume;
6. provides an electrode assembly with shaped profiles that conform to the shape of the power source container;
7. provide a simple construction method for cells with electrodes of varying dimensions that can conform to predetermined profile configurations.

In its simplest form, one aspect of the invention consists of a single unitized solid conductor or bus strip with individual integrated electrode current collector tabs extending out along its length and folded to form an interleaved electrode assembly. A variety of electrode arrangements and assemblies are possible utilizing the basic concepts of the invention and can be better understood by considering the drawings and detailed description of the invention. It should be noted however, that this invention has broad general application to electrochemical cells of batteries which utilize a cathode couple that is capable of providing a useful voltage and/or current when combined with an active anode. It also has broad general applications to capacitors which have the capability to store an electric charge.

BRIEF DESCRIPTION OF THE DRAWINGS

FIG. 7 is a plan view of the cathode shown in FIG. 5 before folding and beginning of the assembly operation;

FIG. 8 is a plan view of the cathode of FIG. 6 before folding and beginning of the assembly operation;

FIG. 9 is a partial plan view of an alternate anode configuration for use with the cathode shown in FIG. 5.

FIG. 10 is another alternate anode configuration shown in plan view of yet another alternate anode configuration to be used with the cathode of shown in FIG. 5;

FIG. 11 is a plan view showing an alternate predetermined cathode configuration shaped to fit a battery container of like configuration;

FIG. 12 is a perspective view of a folded anode and folded cathode in the process of assembly; both electrodes being of alternate configuration according to the invention;

FIG. 13 is a perspective view of the electrode assembly resulting from the combination of the anode and cathode of FIG. 12;

FIG. 14 is a pictorial view of another alternate form of the invention comprising folded and partially assembled anode and cathode electrodes being interleaved together;

FIG. 15 is a perspective view of the assembly resulting from the combination of the anode and cathode of FIG. 14 and, FIG. 16 is a plan view of the cathode utilized in FIG. 12.

DESCRIPTION OF THE PREFERRED EMBODIMENTS

Figure 1:
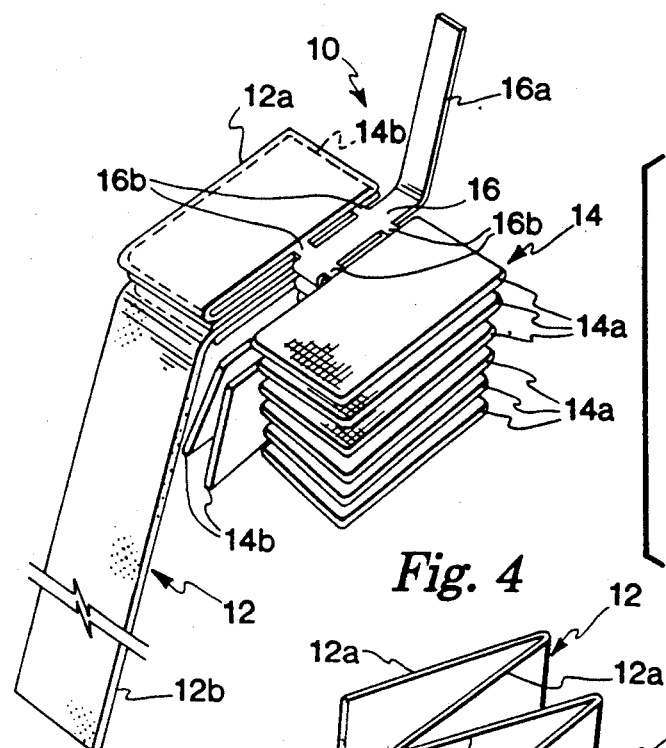
FIG. 1 is a perspective view of a partially assembled electrode assembly according to the invention.

As has already been indicated, the improved electrode assemblies of the invention have broad application to electrochemical cells and batteries of a wide variety in all instances wherein a series of parallel arranged electrode plates are utilized. A key feature of the invention lies in the fact that the anode electrode and cathode electrode are both of one-piece construction thereby simplifying and miminizing electrical conduction problems and electrical continuity within the device in which the electrodes are used.

One of the most preferred types of power sources in which the improved electrode assemblies of the invention are intended for use is a battery or cell having a high rate capability, as has already been indicated. Such batteries (hereinafter referred to generally as cells) usually include an active cathode incorporating active cathode material and an anode of active anode material and a liquid electrolyte which fills the battery container surrounding the electrodes. For example, one such form of such a battery would include a lithium anode, a cathode comprised of manganese dioxide $MnO_2$, silver vanadium oxide $Ag_xV_2O_y$; carbon monofluoride $(CF_x)$; or vanadium oxide such as $V_6O_{13}$ or $V_2O_5$. In addition to lithium for the anode, aluminum, other alkali metals such as sodium and potassium, alkaline earth metals such as calcium, and alloys, mixtures, solid solutions or intermetallic compounds of these metals may be used.

The preferred anode will vary with the specific embodiment. For example, a primary call may utilize a simple lithium foil anode. In certain other embodiments such as rechargeable cells, the preferred anode material may be a linear graphite hybrid with lithium or it may include an organic compound such as a conducting polymer (polacetylene, polyaniline or the like) or even a reducing metal oxide such as $MoO_2$ or $WO_2$, which would incorporate lithium ions into its lattice structure during charge and deintercalate on discharge.

The liquid electrolyte in such a cell might typically comprise a combination of a lithium salt and an organic solvent such as 1.5 molar a solution of lithium trifluoromethane sulfonate ($LiCF_3SO_3$) in a 50:50 volume:volume propylene carbonate and dimethoxyethane. Of course other electrolytes such a lithium perchlorate with polyethyleneoxide polymer electrolyte, an ionically conducting glass, a solid ionomer, an ion exchange polymer, an acrylic polyelectrolyte or other electrolytes known in the art may be utilized as well.

In such a cell, the anode typically lithium or lithium alloy, will typically comprise a continuously elongated element or structure enclosed within separator material. Typically, the cathode will comprise a thin sheet of metal screen or the like, for example, titanium or stainless steel, and a lead portion in the form of a solid thin tab extending from the screen. The cathode further may comprise a body of cathode mixture including cathode active material and binder. The cathode active material may be any of the aforementioned materials as previously described and can include a binder such as polytetrafluorethylene, polyethylene and polypropylene and may also include conductive materials such as graphite powder, carbon black powder and/or acetylene black powder. Such cathode mixtures are generally known in the art and need not be described further in detail herein. Reference may be made to U.S. Pat. No. 4,830,940 to Keister et al which describes such a cathode structure and anode structure in detail, the disclosure of which is incorporated herein by reference.

Another example of a cell of the type in which the electrode assemblies of the invention may be advantageously used is the cell type which comprises an active or oxidizable metal anode, an inactive cathode and electrolytes of the type containing certain materials capable of acting both as an electrolyte carrier i.e., as the solvent for an electrolyte salt, and as the active cathode material for the battery. Such batteries are known in the art and are described by way of example in U.S. Pat. 4,328,289 to Zupancic et al; U.S. Pat. No. 4.264,687 to Dey et al; U.S. Pat. No. 3,998,657 to Auborn et al; and U.S. Pat. No. 4,666,799 to Runquist et al; the disclosures of which are incorporated herein by reference. Batteries of this type are desirable in applications such as: fire alarms, watches, calculators, pacemakers and other medical devices etc.

The most common and well known battery of this type is the lithium/thionylchloride cell. In this type of cell, the cathode is inactive in the sense that the cathode material per se does not take a chemical part in the oxidation reduction reactions of the cell. Rather, a cathode "current collector" is exposed to the cathode electrolyte along with the oxidizable active anode. Typically, the active oxidizable anode material for such a cell is lithium or a lithium alloy. However, other oxidizable anode materials are used in these kinds of cells and generally may include the other alkali metals such as sodium and potassium etc., and alkaline earth metals such as calcium and alloys of these metals. The anode is typically constructed of the oxidizable metal in contact with a suitable supporting metal grid or screen as described hereinabove with reference to the high rate cells. The grid for lithium anode, for example, may be made of nickel, nickel alloy such as Monel, stainless steel, tantalum or platinum.

The cathode-electrolyte solvents known to be useful in this type of cell in addition to thionyl chloride, includes sulfur dioxide and other fluid oxyhalides, non-metallic oxides, halogens, non-metallic halides and mixtures thereof such as phosphorous, oxychloride, ($POCl_3$), selenium chloride ($SeCl_2$), sulfur trioxide ($SO_3$), vanadium oxitrichloride ($VOCl_3$), chromicoxychloride ($Cr_2Cl_2$) and others. Other non-aqueous solvents may be included along with the aforementioned cathodic active materials such as organic solvents including propylene carbonate, acetonitrile, methylformate, tetrahydrofuran and the like which have been generally used for non-aqueous, high energy density lithium and lithium/$SO_2$ cells.

Electrolyte salts commonly used in batteries of this second type include alkali and alkaline earth metal halides, tetrohaloaluminates, tetrahaloborates and soluble lithium salts such as $LiCl_4 LiBF_4$ and the like.

This type of cell as already indicated utilizes a cathode current collector which may include a porous element of an inert conductive material in contact with the cathode-electrolyte. Preferably, the porous element of the current collector is a high-surface-area body of any particular predetermined shape and form required for the particular battery design contemplated. Porous carbon cathode elements are preferred. Satisfactory carbon cathode current collector elements of this type may be formed by pressing particulate carbons such as carbon black or a acetylene black or graphite to a desired form. To impart a cohesive characteristic to such particulate pressed bodies, a suitable binder material may be added to the particulate. Suitable binder materials for this purpose include polytetrafluoroethylene, polychlorothrifluoroethylene, and the like. The cathode structure is typically enclosed within a separator material and in accordance with the present invention will ultimately be folded into a desired configuration as is more specifically described hereinbelow.

Thus, it can be seen from the foregoing, that the exact cathode and anode electrode structures may vary from being passive to active in the case of cathodes and may vary over a wide range of materials in the case of both the anodes and cathodes. Generally speaking, lithium and lithium alloys are the most preferred anode material and from a structural standpoint, such an electrode may be pure malleable lithium or alloy material or it may be pressed onto a suitable screen or grid which is subsequently enclosed in separator material if desired and folded to the desired configuration. For the purposes of the present description of the subject invention, it is to be assumed that the cathode and anode electrodes described hereinbelow are of a structural and chemical make-up suitable for whatever use intended and that such structure and chemical make-up is already known in the art. In some instances, the electrode structure will be a composite consisting of a grid and pressed material as already described hereinabove whereas in other cases, the electrode structure may consist merely of a malleable material having the requisite shape.

The enclosing separator material may be of a variety of types. For example, a non-woven and/or microporous polyethylene or polypropylene may be used. Preferably, anode electrode and cathode electrode will be enclosed in such a separator material. However, it is possible that only one electrode i.e., the anode or the cathode, be enclosed depending on the type of cell arrangement desired. Separation may also be accomplished by the use of solid electrolyte or an ionically permeable separator or coating on the electrode. Also, it is not necessary that an electrode be enclosed, it is only necessary that they be separated.

Figure 3:
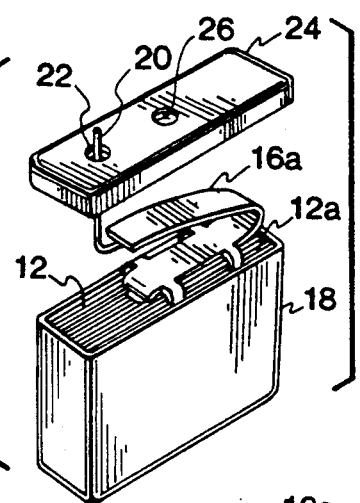
FIG. 3 is an exploded perspective view of the assembly of FIG. 2 inserted into a battery container preparatory to sealing by a closing cover.
Figure 4:
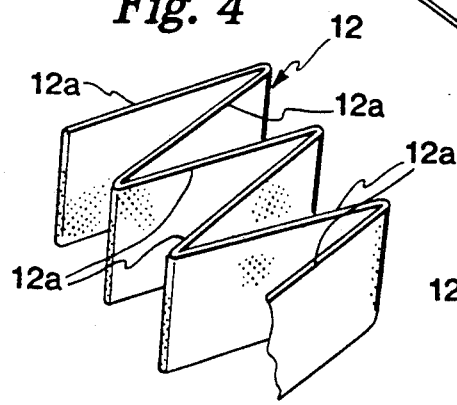
FIG. 4 is a perspective of a folded one piece anode segment usable in the construction and assembly of the cell of FIGS. 1-3 and in other configurations as well.

Referring now to FIGS. 1-4 and 8 specifically, a first alternate embodiment of the invention will be described. The partially assembled electrode assembly generally indicated at 10 in FIG. 1 is made up of an anode 12 as generally indicated in FIG. 4 and a cathode 14 as generally indicated in FIG. 8. Anode 12 comprises a continuous elongated element or structure preferably of alkali metal, most preferably lithium or lithium alloy which may be folded as shown in FIG. 4 into a plurality of sections 12a. These sections are ultimately, during assembly, interposed or interleaved between like configured sections 14a of the cathode.

Figure 2:
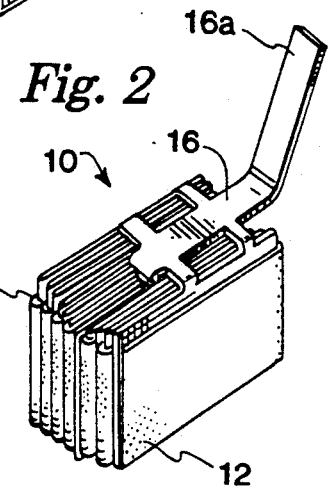
FIG. 2 is a perspective view of the complete assembly shown in FIG. 1.

Cathode means 14 as shown in FIG. 8 in plan view comprises an elongate central core or bus bar 16 from which a plurality of tab-like cathode sections or plates 14a extend along the length thereof. Bus 16 terminates in an elongated extending tab 16a which serves as a cathode lead in the cell structure. Tabs 14a are connected to bus 16 by means of interconnecting portions 16b by means of which tabs 14a may be folded downwardly during assembly as shown at 14b in FIG. 1. Initially, however, the bus bar is folded at the 16b location as shown in FIG. 8 to result in a cathode folded configuration as shown in FIG. 1. Then, as shown in FIG. 1, anode 12 is overlaid on a cathode tab 14b and is sequentially led in a zig-zag fashion downwardly through the stack of cathode tabs 14b on the one side, following which the tabs are bent downwardly as shown at FIG. 14b and the remaining length 12b of anode 12 is then similarly interleaved upwardly around the stack of spaced cathode plates 14a on the other side of the folded bus bar 16 following which those plates are then bent downwardly along with the interleaved anode as well to form the assembly as shown in FIG. 2 in which the outside surfaces thereof comprise anode 12 as shown.

In the instance of this type of cell construction, the anode is not enclosed within a separator material, however, the cathode structure is. Consequently, when the asembly 10 as shown in FIG. 2 is inserted into metallic battery container 18 as shown in FIG. 3 the exposed outer portions of anode 12 contact the interior walls of battery container 18 to provide what is known as a case negative battery. The extending length 16a of bus bar 16, serving a lead, is then bent as shown and a lead wire 20 is appropriately connected thereto by welding or the like and extends through a suitable feedthrough 22 arrangement in a container cover 24. 24 is ultimately also welded to container 18 to provide a suitably sealed arrangement into which an appropriate electrolyte may be poured as through an opening 26 in cover 24. Opening 26 is then ultimately sealed with a welded plug or the like. Such a cell with a cathode lead 20 extending therefrom may then be contacted by another lead attached to container 18 (not shown) to thereby provide exterior anode and cathode electrical connection to the cell.

As can be seen from the above described embodiment, both anode 12 and cathode 14 are of single unitized construction to provide a simple reliable, low resistance cell construction.

Figure 5:
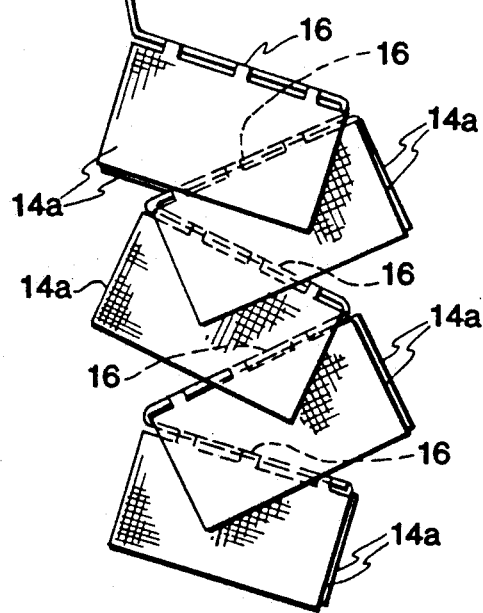
FIG. 5 is a pictorial view of an alternate cathode folding and assembly configuration.

Referring now specifically to FIGS. 5 and 7, an alternate form of cathode folding arrangement is shown utilizing a slightly modified plan configuration as shown in FIG. 7. In this embodiment, paired and oppositely dispersed cathode sections 14a are alternately folded upwardly and downwardly along the length of bus bar 16 while bus bar 16 is folded in a zig-zag fashion as seen in FIG. 5 whereby paired cathode sections 14a sequentially enclose each other within the folded configuration. A one-piece anode means as shown in FIG. 4 may then be interleaved between cathode sections 14a to provide an electrode assembly which is substantially similar to that shown in FIG. 2, the primary difference being that the folded sections of bus bar 16 extend completely over the top surfaces of the cathode tabs 14a, rather than partially as shown in FIG. 2.

Figure 6:
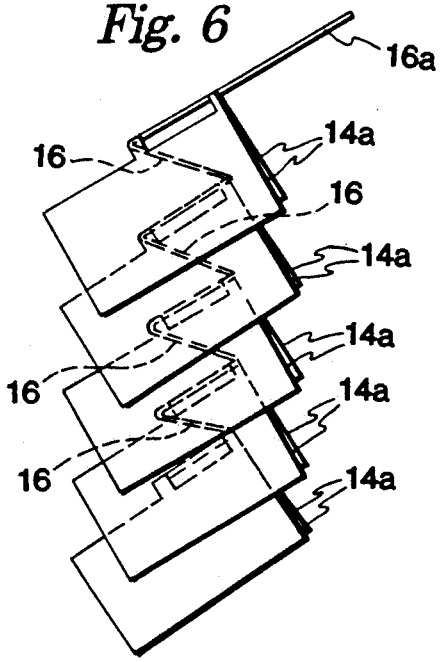
FIG. 6 is pictorial view of another alternate cathode folding and assembly configuration.

On the other hand, referring now to FIG. 6 and FIG. 8 specifically, if the partial extension of bus bar section 16 across the upper part of the assembly is desired as shown in FIG. 2 an alternate folding arrangement of the cathode of FIG. 8 may be utilized as shown in FIG. 6. In this arrangement, the cathode tabs 14a are all folded downwardly i.e., in the same direction along the length of bus bar 16a and then bus bar 16 is folded in a zig-zag fashion to allow paired tabs 14a to sequentially enclose successive tabs as shown in FIG. 6. The assembly is then completed as before by means of an elongated anode of the type shown in FIG. 4 to provide an electrode assembly substantially like the one shown in FIG. 2.

Referring now to FIGS. 9, 10 and 14, it is also possible according to the invention to utilize an anode having a configuration similar to the cathode configurations as already discussed hereinabove, i.e., one in which the various anode sections 12c (FIGS. 9 and 10) are oppositely disposed along the length of a bus bar 28 which is essentially similar to bus bar 16a of the preceding Figures. Such an anode when folded similarly to the cathodes in FIGS. 5 and 6, may then be interleaved in a manner similar to that shown in FIG. 14 to provide a completed electrode assembly having separate anode and cathode leads extending therefrom. As can be seen in FIGS. 9 and 10, in the plan views shown, the anode will include a terminal single anode section 12b which would be inserted in between the center paired cathode sections 14a of the subassembly.

Referring now to FIG. 11, a plan view of a cathode of different configuration is shown in which the various cathode sections 14a have rounded ends specifically shaped and adapted to fit a battery container having a rounded bottom. The anode would be similarly configured.

Figure 16:
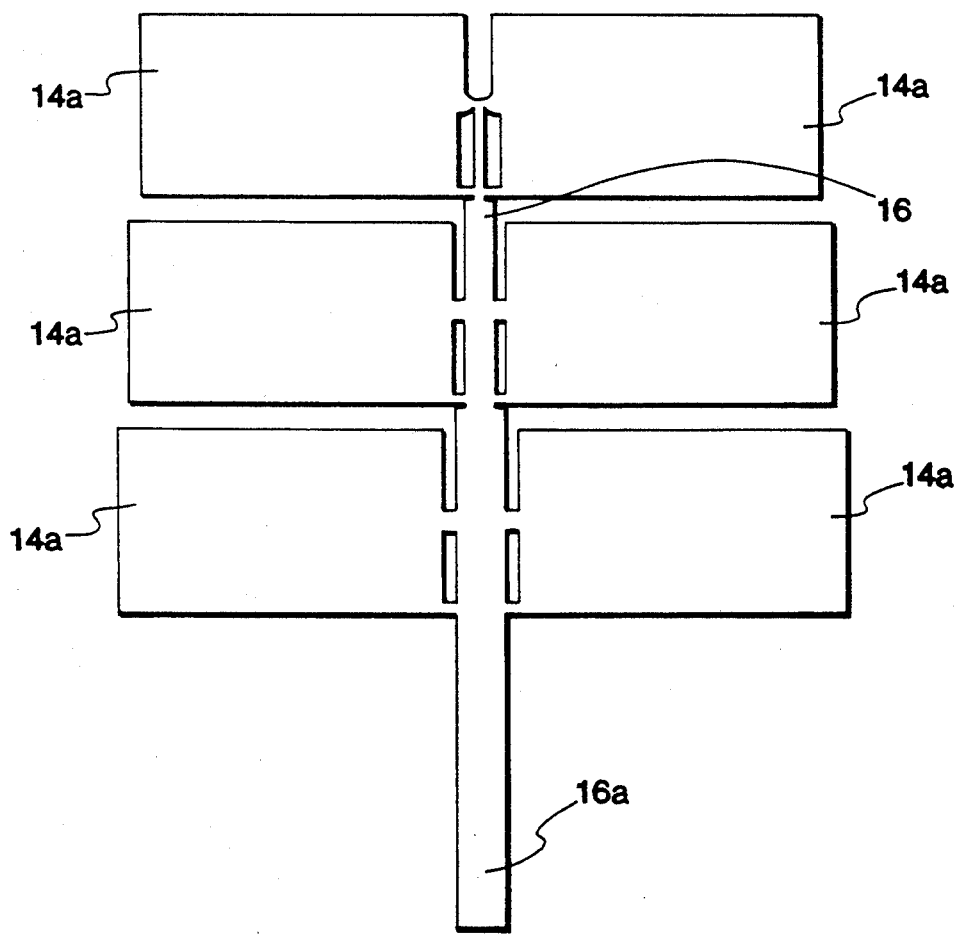

Referring now to FIGS. 12, 13, and 16, another alternate embodiment of the invention is shown in which the anode generally indicated at 12 comprises a generally rectangular planar body which may be folded as shown in FIG. 12 and includes a pair of upwardly projecting lead portions 30 as shown. A cathode generally indicated at 14 and shown in the plan view of FIG. 16, includes the bus 16 with bus leads 16a and generally rectangular cathode tabs or sections 14a which may be folded as shown in FIG. 12 and interleaved with anode sections 12a to provide the subassembly as shown in FIG. 13. This subassembly may be inserted into a battery container as previously described with appropriate feedthrough leads connected to the integrated bus leads 16 and 30 for appropriate electrical connection to the sealed cell.

Referring now to FIGS. 14 and 15, another embodiment of the invention is shown which comprises an anode generally indicated at 12 and a cathode indicated at 14 which are of substantially of the types shown in FIGS. 9 and 10 for anode 12 and FIG. 8 for cathode 14 whereby appropriate folding as indicated and interleaving of anode and cathode sections will provide the resultant structure shown in FIG. 15—an electrode assembly. Again, as shown, the outer surface of the subassembly is comprised of an anode. However, it is to be understood that the outer surface could be comprised of the cathode so as to provide a case positive cell structure, or as shown, both electrodes would be enclosed in separator material so as to insulate both from each other and the interior of the cell container whereby lead 16 and 28 would be utilized for eventually making electrical contact to the cell.

Another embodiment of this invention may take the form of a capacitor, such as one that is capable of both rapid charge and discharge. In such a device electrodes as shown in FIGS. 8 and 9 are prepared by coating polymer bonded activated carbon onto metallic grids as has already been described herein. The electrodes are moisturized with diluted sulfuric acid and separated with an ion permeable separator as shown in FIG. 15 to form a capacitor unit cell. Packaged unit cells can be combined in series to give the capacitor a specific operating voltage.

Still another embodiment of this invention may take the form of an electrolytic capacitor, in which the electrodes consist of aluminum foil formed to the shape shown in FIG. 8 and FIG. 10 and anodized. Electrode 10 is enclosed in a dielectric material and folded with Electrode 8 to form the electrode assembly as shown in FIG. 15. The electrode assembly is then packaged and impregnated with an electrolyte solution and sealed.

In still another example, the electrode structures could be cut from an activated carbon felt that has a large surface area (over 1500 $m^2/g$) to form a battery or capacitor as described in the article entitled Lightweight, Stable, and Rechargeable Battery and Capacitor with Activated Carbon Fiber Electrode, by T. Nogami et al., which appeared in Journal De Physique, Colloque C3, supplement au n°6, Tome 44, Juln 1983, the content of which is incorporated by reference.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. An electrode assembly for energy storage devices, the assembly comprising first and second electrode means, and separator means separating the electrodes from each other;

the first electrode means comprising a plurality of sections of predetermined configuration;

the second electrode means being of one-piece contruction and further comprising an elongate bus bar and multiple pairs of oppositely disposed electrode tabs of a predetermined configuration and which are commonly connected along the bus bar over its length, the bus bar being foldable in sections over its length and each electrode tab pair being foldable toward each other on opposite edges of the bus bar whereby the electrode means in assembled relationship are arranged in interleaved and folded fashion as follows: the bus bar is folded at discrete intervals along its length whereby the second electrode tabs are folded so as to serially and sequentially enclose therebetween successive tab pairs folded along the length of the bus bar, and the first electrode means is arranged with its sections interleaved between the second electrode tabs.

2. An electrode assembly for energy storage, the assembly comprising first and second electrodes, each of which is of one-piece construction, and separator means separating the first and second electrodes from each other;

the first electrode being planar and elongate and foldable over its length to provide a plurality of individual sections of predetermined configuration between folds;

the second electrode comprising an elongate bus bar and multiple pairs of oppositely disposed electrode tabs of a predetermined configuration conforming to that of the first electrode sections, the tabs being commonly connected along the elongate bus bar over its length, the bus bar being foldable in sections over its length, and each electrode tab pair being foldable toward each other on opposite edges of the bus bar whereby the elements in assembled relationship are arranged in interleaved and folded fashion as follows: the bus bar is folded at discrete intervals along its length and the second electrode tabs are folded so as to serially and sequentially enclose therebetween successive electrode tab pairs folded along the length of the bus bar, and the first electrode is folded along its length with the discrete folded sections thereof interleaved between the second electrode tabs.

3. The electrode assembly of claim 2 wherein the separator means is in the form of an enclosure around one of the electrodes.

4. The electrode assembly of claim 2 wherein the separator means is in the form of an individual enclosure around the first electrode before folding and separate enclosures around each of the second electrode tabs.

5. The electrode assembly of claim 2 wherein the first electrode is in the shape of an elongated rectilinear strip and the second electrode tabs are of rectilinear configuration.

6. The electrode assembly of claim 2 wherein the bus bar of the second electrode decreases in width over its length from one end to the other.

7. The electrode assembly of claim 2 wherein the first electrode is an elongated strip and the folded sections thereof are curvilinear at least in part and the second electrode tabs are likewise.

8. The electrode assembly of claim 2 wherein the first electrode comprises an elongate bus bar and multiple pairs of oppositely disposed electrode tabs of a configuration corresponding to the tab configuration of the second electrode tabs, the first electrode tabs being commonly connected along the elongate bus bar over its length, the bus bar being foldable in sections over its length and each first electrode tab pair being foldable toward each other on opposite the edges of the bus bar.

9. The electrode assembly of claim 8 wherein the first and second electrode tabs are of rectilinear configuration.

10. The electrode assembly of claim 8 wherein the first and second electrode tabs are of curvilinear configurations at least in part.

11. The electrode assembly of claim 8 wherein the bus bar of the first electrode decreases in width over its length from one end to the other.

12. The electrode assembly of claim 2 wherein each successive pair of second electrode tabs are folded toward each other on the bus bar but in a direction opposite to that of the immediately preceding pair of tabs.

13. The electrode assembly of claim 2 wherein all of the second electrode tab pairs on the bus bar are folded in the same directions i.e., upwardly or downwardly on the bus bar.

14. The electrode assembly of claim 2 wherein the last outer electrode means sections in the interleaved assembly are of the first electrode sections.

15. In combination, the electrode assembly of claim 14 was in a metal container, the outer electrode means sections directly contacting the inner wall of the container for making electrical contact therewith.

16. The combination of claim 15 in which the bus bar of the second electrode includes an extended end portion which serves as an electrical contact.

17. The combination of claim 16 in which the container includes a cover, the underside of which is electrically contacted by the extended end portion of the second electrode bus bar and the combination further includes an electrical feed through in the cover making interior contact with the bus bar extended end portion.

18. The electrode assembly of claim 2 wherein the last outer electrode means sections in the interleaved assembly are of the second electrode means.

19. In combination, the electrode assembly of claim 18 within a metal container, the outer electrode means sections directly contacting the inner wall of the container for making electrical contact therewith.

20. The combination of claim 19 in which the first electrode means is of the bus bar-tab configuration, the bus bar including an extended end portion which serves as an electrical contact.

21. In combination, the electrode assembly of claim 8 within a metal container, means in the container electrically separating the electrodes therefrom, and each electrode bus bar including an extended end portion serving as an electrical contact.

22. An electrode assembly for energy storage devices, the assembly comprising first and second electrode means, and separator means separating the electrodes from each other;
the first electrode means comprising a plurality of sections of predetermined configuration;
the second electrode means being of one-piece construction and further comprising an elongate bus bar and multiple electrode tabs of a predetermined configuration which are commonly connected along the bus bar over its length, the bus bar being foldable in sections over its length and each electrode tab being foldable along the bus bar whereby the electrode means in assembled relationship are arranged in interleaved and folded fashion as follows: the bus bar is folded at discrete intervals along its length whereby the second electrode tabs are folded so as to serially and sequentially enclose therebetween successive electrode tabs folded along the length of the bus bar, and the first electrode means is arranged with its sections interleaved between the second electrode tabs.

23. An electrode assembly for energy storage, the assembly comprising first and second electrodes, each of which is of one-piece construction, and separator means separating the first and second electrodes from each other;
the first electrode being planar and elongate and foldable over its length to provide a plurality of individual sections of predetermined configuration between folds;
the second electrode comprising an elongate bus bar and multiple pairs of electrode tabs of a predetermined configuration conforming to that of the first electrode sections, the tabs being commonly connected along the elongate bus bar over its length, the bus bar being foldable in sections over its length, and each electrode tab pair being foldable along the bus bar whereby the elements in assembled relationship are arranged in interleaved and folded fashion as follows: the bus bar is folded at discrete intervals along its length and the second electrode tabs are folded so as to serially and sequentially enclose therebetween successive electrode tab pairs folded along the length of the bus bar, and the first electrode is folded along its length with the discrete folded sections thereof interleaved between the second electrode tabs.

24. The electrode assembly of claim 23 wherein the first electrode comprises an elongate bus bar and multiple tabs of a configuration corresponding to the tab configuration of the second electrode tabs, the first electrode tabs being commonly connected along the elongate bus bar over its length, the bus bar being foldable in sections over its length and each first electrode tab pair being foldable along the edges of the bus bar.

25. A battery incorporating the assembly of claim 22.

26. A capacitor incorporating the assembly of claim 22.

* * * * *